No. 779,189. PATENTED JAN. 3, 1905.
E. THOMSON.
POWER GENERATING APPARATUS.
APPLICATION FILED APR. 12, 1900.
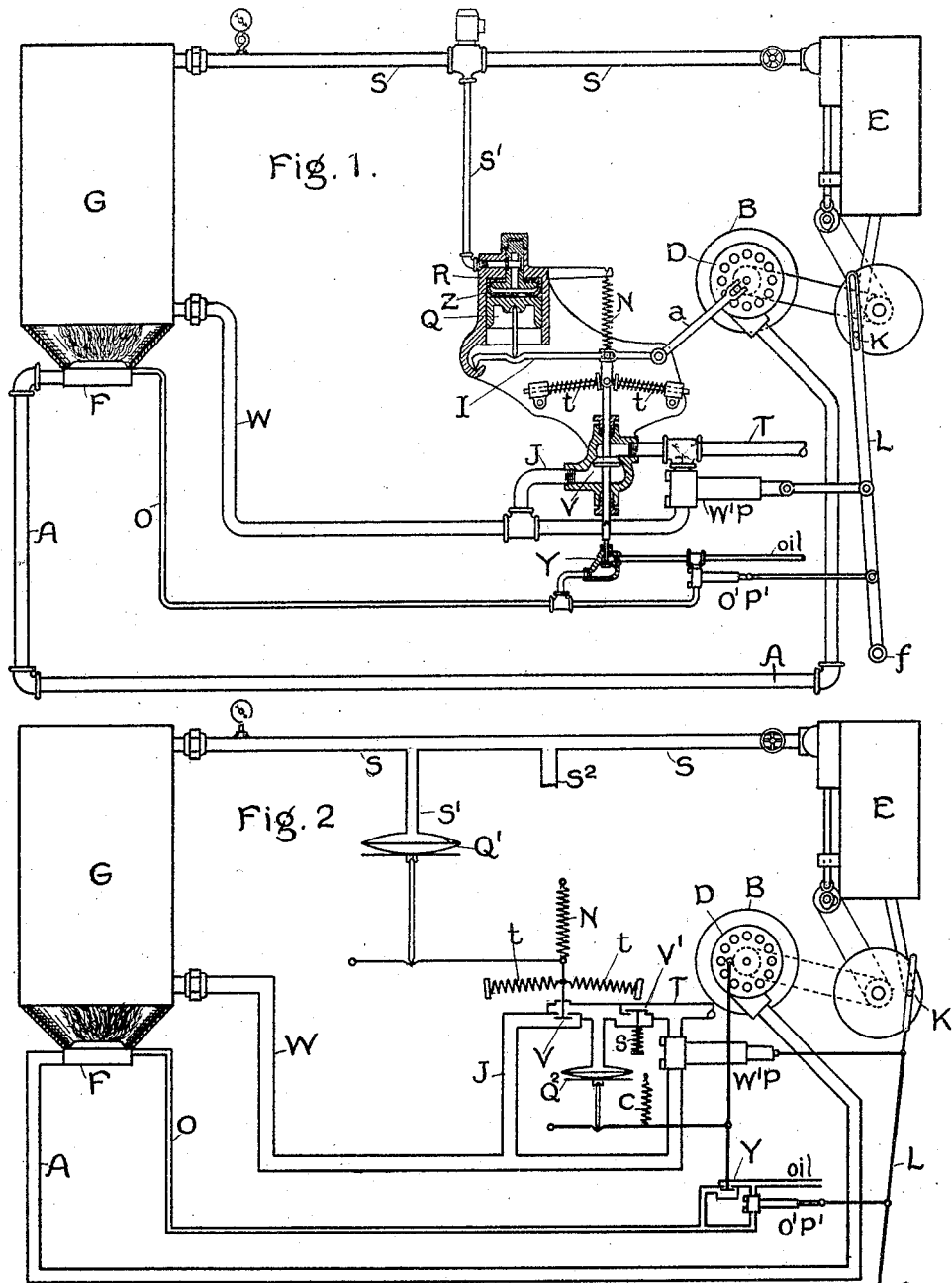
WITNESSES.
Henry D. Westendarp
Alex F. Macdonald
INVENTOR
Elihu Thomson No. 779,189.  
Patented January 3, 1905.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

POWER-GENERATING APPARATUS.

SPECIFICATION forming part of Letters Patent No. 779,189, dated January 3, 1905.

Application filed April 12, 1900. Serial No. 12,557.

*To all whom it may concern:*

Be it known that I, ELIHU THOMSON, a citizen of the United States, and a resident of Swampscott, county of Essex, and Commonwealth of Massachusetts, have invented a new and useful Improvement in Power-Generating Apparatus, of which the following is a specification.

The present invention relates to those systems of development of power in which the generation of steam or vapor for working an engine is controlled by the amount of water fed to a vaporizer or steam-generator, such as a flash-boiler, at the same time that the amount of fuel is simultaneously regulated in accordance with the water-feed, the fuel generally being some combustible oil, such as kerosene-oil.

It also relates to those systems in which the air that is fed to the burner is positively regulated to an amount which is proper for the complete combustion of the fuel supplied, and the air supply may therefore in addition be under the same control that the water-feed and the oil-feed are under. The source of power for pumping these various feeds may be any power convenient or may be an engine driven directly from the vapor generated, such as a small steam-engine of proper type. Either the whole of the vapor generated may drive this power plant or a portion thereof only, leaving a portion for the driving of separate machinery.

I have described in patent application Serial No. 683,000, filed June 9, 1898, steam-generating apparatus, methods of controlling the generation of vapor through the control of the water-feed and the fuel-feed, and have also described in addition thereto the control of the air-supply.

In my present invention I make the pressure of the vapor or steam generated act when it exceeds a certain amount to cut off the feed-water from the boiler, the oil or fuel supply, and when desired the air-supply, and my invention provides that this be done in a decided or definite manner, it being impractical in practice to regulate the proportions by simply diminishing in accordance with the rise of pressure the amounts of each fluid-supply. I prefer, therefore, on account of this difficulty in practice to accomplish this regulation by intermittence, as by cutting off at once nearly the whole or the major part of each supply and letting on with equal positiveness and celerity the full supply at intervals.

In my apparatus the pressure-response arrangements, such as a piston or diaphragm, is acted upon by the steam-pressure or that of the pressure of the vapor generated in such a way as to throw over quickly a set of valves controlling the supply of water or other fluid to be vaporized and of oil to be burned, and, if need be, to vary the amount of air admitted to the burner.

Reference is had to the accompanying drawings, in which—

Figure 1 shows the arrangement; Fig. 2, a similar arrangement with minor modifications; Figs. 3 and 4 show enlarged details.

Let G stand for a steam-generator, such as a coil or flash-boiler, with a fire and burner F under same for heating it.

I mean by a "flash-boiler" one in which the water is gradually heated to the point of vaporization, after which the vapor is superheated.

W is a water-feed pipe; S, the steam-pipe leading from the generator to an engine, as at E, while O is an oil-supply to the burner F, and A may be an air-pipe from a blast or blow apparatus B, driven by power from the engine E, as indicated.

Assume the generator G hot and in a condition to generate vapor. A water-pump W' P is set in motion by engine E with suitable means, such as the lever L, (shown in the figure,) having a fixed fulcrum, as $f$, and a slot through which a crank-pin is placed at K, said crank-pin being carried by the engine or rotating regularly. The lever L in oscillating pumps the feed-water from a suitable supply-pipe, as T, leading from a tank or other supply to the feed-pipe W and gives it the desired pressure to force it into generator G. There is a by-pass connection J around the pump W' P that joins the pipe T with pipe W. It is preferred to regulate by by-pass instead of cutting off the main stream or altering the stroke of the pump. In this by-pass is shown a valve V, which can be opened and closed, so as to let the water pass through J or shut it off at intervals. In a similar way an oil-pump O' P' takes oil from a suitable oil-supply and forces it into pipe O and to the burner F, and a suitable by-pass valve Y is provided which can be opened and shut at intervals like valve V, and connections are made so that these two may be substantially opened and shut together. Whenever, then, the water-supply is checked, the oil-supply is simultaneously checked. The opening of the valve Y, however, can be so set that a small supply—i. e., oil enough to just sustain the fire F—is kept moving toward the burner. This amount should be adjusted so as to make up to a certain extent for loss by radiation when the water fed through W is checked and may be a moderate fraction of the total oil-supply. A rotary blower or pump at B has placed against its inlet-openings a circular disk or valve, D, provided with corresponding openings. This disk when in one position nearly covers the openings of B and in another position leaves them free. This is indicated in Figs. 3 and 4.

In Fig. 3 the circular disk valve D is seen as half covering the inlet-openings, and the arm $a$ can be used to throw the disk valve D around. In Fig. 4 the same is seen in section, and the inlet-openings are unobstructed by the valve D. Any form of rotary blower, as a fan-motor or positive blower, may be employed which will move the air from the openings D out through the supply-pipe to the burner F. It is to be understood that where a natural draft is employed this part of the apparatus could be dispensed with.

Depending from the steam-pipe S S is a pipe S', which connects with a diaphragm-regulator or piston-regulator. In the figure the regulator R contains a piston Q, bearing upon an elastic diaphragm just above at Z, which diaphragm prevents any leak by the piston. Lever I is pressed down by the piston and against a spring N, which is adjusted to be the right amount to respond only when the pressure in S S has attained a certain value. This spring N, however, is assisted somewhat by two compression-springs $t\,t$, arranged on rods or guides and bearing upward in the position shown—i. e., when valves V and Y are both shut. On increase of pressure the spring N is overcome by the movement of piston Q, and the springs $t\,t$ take a horizontal position gradually, or their effect becomes a rapidly-decreasing one. This makes the movement of the valve-stem carrying valves V and Y sudden, inasmuch as springs $t\,t$ when their inner ends are carried down sufficiently will assist the piston Q in opening the valve V. It is desirable that there should be some slack or play in the joints operating the valve, so as to let the action just described take place. The spring N should have a substantially uniform effect. The effect of piston Q should be uniform at a given pressure through a small range, and the effect of springs $t\,t$ is to break down, as it were, under increase of pressure, permitting a sudden movement of the valve. On the fall of pressure on S S the reverse action takes place and is equally sudden. Many other devices for producing this "pop" action may be employed, and the action is similar to that employed in what are called "pop safety-valves." The setting, in other words, is that of unstable equilibrium, and any device which gives a proper unstable equilibrium relation will satisfy my invention. Suppose now a fall of pressure takes place in S S. The valves V and Y are closed, the full action of pump W' P in forcing the water into the feed-pipe W is exerted, and so with the oil-pump O' P' in forcing oil to the fire, and those quantities are adjusted so that the oil is employed to vaporize the water fed. If now the effect of this feed of water and oil is to raise the steam-pressure in S S, assuming the consumption not to exceed a certain limit, the excess pressure acting in piston Q causes a sudden opening of both valves V and Y, thus by-passing the pumps W' P and O' P'. There may be a check-valve in the pipe W between the by-pass J and the generator G to prevent regurgitation when the valve V is open, and in like manner there may be a check-valve in pipe O between the by-pass valve Y and the fire or burner F.

The principle of action will be exemplified perhaps more clearly by an inspection of Fig. 2, which involves also a modification. As before, the pipes W, O, and A represent the water, oil, and air supply, and the pumps W' P and O' P' and the blower B supply the three fluids. The pressure-response diaphragm Q' acts upon a lever against a spring N, and the overbalanced or unstable setting by springs $t\,t$ or other equivalent mechanism is provided, so as to open valve V and by-pass upon the water-supply from pump W' P alone. There is a secondary by-pass valve V' located in the same by-pass passage J on the pump side of valve V. It is adjusted by a spring $s$ to open only on a certain definite pressure being reached. It therefore maintains when valve V is opened this definite pressure upon a second diaphragm or piston $Q^3$ responsive to this pressure, and it is this diaphragm $Q^2$ which opens the oil by-pass Y and moves, if desired, the circular valve D, controlling the air-supply. Assuming, as before, an increase of pressure in S S causes diaphragm Q' to press downward and suddenly open valve V, which sudden opening is assisted by the fact that it need not be a balanced valve, but may be held to its seat by the pressure in J and W, which pressure is relieved when it opens. The opening of the valve V allows the pressure in J to be exerted upon diaphragm $Q^2$ up to the amount set by the spring-seated valve V', as above stated. This pressure is sufficient to cause valve Y to open and valve D to close. A spring C tends to return the diaphragm $Q^2$, and to permit this to occur promptly the valve V' need not fit with perfect closeness to its seat, but may leak a little. When valve V is closed, therefore, the spring C gradually sets back diaphragm $Q^2$ and again closes valve Y, which is a by-pass for the oil-pump, to let on a full supply of oil and opens valve D, giving a full supply of air. As stated before, the engine E may use only a portion of the vapor or steam generated, and a branch pipe $S^2$ may indicate a connection to another engine. Also the engine E may be entirely devoted to the running of the pump mechanism, no other power being taken from it.

In accordance with the provisions of the patent statutes I have described the principle of operation of my invention, together with the apparatus which I now consider to represent the best embodiment thereof; but I desire to have it understood that the apparatus shown is merely illustrative and that the invention can be carried out in other ways.

What I claim as new, and desire to secure by Letters Patent of the United States, is—

1. In a system of control for steam-engines, the combination of a boiler, a burner, a means for supplying water to the boiler, means for supplying fuel to the burner, means for suddenly admitting or cutting off the supplies of water to the boiler and fuel to the burner, and a regulator which causes the said means to operate.

2. In a system of steam generation, the combination of a flash-boiler, a burner, a source of water-supply, a source of fuel-supply, a water-controlling valve, a fuel-controlling valve, a single means for causing both valves to suddenly open or close, and a steam-pressure regulator which controls the action of said means.

3. In a system of control, the combination of a boiler, a pump for supplying water thereto, a burner, a source of fuel-supply, a valve controlling the passage of fuel to the burner, a means working over a dead-center for holding the valve in the open or closed position so that fuel will be suddenly admitted or cut off from the burner, and a pressure-regulator for controlling the action of said means.

4. In a system of control, the combination of a boiler, a pump for supplying water thereto, a burner, a source of fuel-supply, a valve controlling the passage of fuel to the burner, a spring for snapping the valve into both open and closed positions, and means acting on said spring which is controlled by the boiler-pressure.

5. In a system of control the combination of a source of fuel-supply, a source of water-supply, a valve in the water-supply circuit, means acted upon by the boiler-pressure for opening and closing the valve, and a device assisting the said means to suddenly open and close the valve with a snap, whereby the control of the water-supply is rendered intermittent.

6. In a system of control, the combination of a source of fuel-supply, a source of water-supply, a valve in the water-supply circuit, a valve in the fuel-supply circuit, means acted upon by the boiler-pressure for simultaneously opening or closing both of the valves, and means for imparting a sudden movement to the valves either to open or close them, whereby the controlling of the water and fuel is rendered intermittent.

7. In a system of control, the combination of a boiler, a pump for supplying water to the boiler, a source of water-supply, a burner, an air-pump for supplying air to the burner, and means for varying the amount of air delivered by the pump to the burner, a device working over a dead-center for regulating the action of said means, and a regulator which is acted upon by the boiler-pressure for controlling said device.

8. In a system of fuel control, the combination of a boiler, a burner, air, water and fuel pumps, means for suddenly admitting or cutting off the supplies of water to the boiler, and air and fuel to the burner, and a regulator which causes said means to operate.

9. In a system of boiler regulation, the combination of a boiler, a burner, water and fuel pumps, a regulator for each pump, a steam-controlled device for governing the water-supply, and a water-controlled device for governing the fuel-supply.

10. In a system of steam control, the combination of a boiler, into which water is forced under considerable pressure, a burner, a fuel-pump, a water-pump, a fuel-circuit, a water-circuit, a by-pass valve in the fuel-circuit, a by-pass valve in the water-circuit, and means controlled by the boiler-pressure for suddenly closing and opening the by-pass valves instead of actuating them gradually, whereby intermittence of regulation is accomplished.

11. In a system of boiler regulation, the combination of a boiler, a burner, water and fuel pumps, a valve in circuit with each pump for regulating its delivery, a steam-controlled diaphragm for regulating the water-supply, and a water-controlled diaphragm for regulating the fuel-supply.

12. In a system of steam regulation, the combination of a vaporizer, a burner, a source of water-supply, a source of fuel-supply, a movable device acted upon by the boiler-pressure for controlling one source of supply, and a second movable device acted upon by the fluid controlled by the first-mentioned device for controlling the other source of supply.

13. In a system of regulation, the combination of a vaporizer, a burner, an engine, a water-pump, an oil-pump, a blower, the said pumps and blower all being driven at full stroke and at constant speed, by the engine, by-pass valves for the oil and water pumps, a regulating-valve for the blower, a regulator acted upon by the boiler-pressure for simultaneously affecting the position of the valves, and means for rendering the action of all the valves intermittent.

14. In combination, a boiler, a means for supplying liquid thereto in accordance with the demand for vapor energy, a burner, a means for supplying fuel to the burner in accordance with the demand for heat, separate by-pass valves for each of said means, and a device for simultaneously moving the by-pass valves.

15. In combination, a boiler, a burner, a pump for supplying liquid to the boiler, a pump for supplying fuel to the burner, a by-pass valve in the circuit of each of the pumps, and a means for simultaneously adjusting the by-pass valves.

16. In combination, a boiler, a burner, pumps for supplying liquid to the boiler and fuel to the burner, a means for imparting simultaneous movements to the pumps, by-pass valves for the pumps, and automatic means for actuating the valves in a manner to vary the deliveries of the pumps.

17. In combination, a boiler, a burner, pumps for supplying liquid to the boiler and fuel to the burner, a means for imparting simultaneous movements to the pumps, by-pass valves for the pumps, and a pressure device acting on the valves for causing corresponding variations in the liquid and fuel supplies.

18. In combination, a boiler, a burner, pumps for supplying liquid to the boiler and fuel to the burner, a means for imparting simultaneous movements to the pumps, by-pass valves for the pumps, automatic means for actuating the valves in a manner to vary the deliveries of the pumps, and a device for returning the automatic means to its initial position.

19. In combination, a generator, a burner, a water-pump, a fuel-pump, a by-pass regulator for the water-pump, a by-pass regulator for the fuel-pump, and a single means which directly controls the action of both regulators and through them the delivery of the pumps.

In witness whereof I have hereunto set my hand this 7th day of April, 1900.

ELIHU THOMSON.

Witnesses:
 DUGALD MCKILLOP,
 CHAS. B. BETHUNE.